(12) United States Patent
Tanaka

(10) Patent No.: US 9,781,242 B2
(45) Date of Patent: Oct. 3, 2017

(54) SETTING SYSTEMS AND SETTING METHODS

(75) Inventor: Motoshi Tanaka, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 14/364,107

(22) PCT Filed: Sep. 10, 2012

(86) PCT No.: PCT/JP2012/073079
§ 371 (c)(1),
(2), (4) Date: Jun. 10, 2014

(87) PCT Pub. No.: WO2013/088800
PCT Pub. Date: Jun. 20, 2013

(65) Prior Publication Data
US 2014/0308989 A1  Oct. 16, 2014

(30) Foreign Application Priority Data
Dec. 16, 2011   (JP) .................................. 2011-275598

(51) Int. Cl.
*H04M 1/725*  (2006.01)
*H04M 1/04*  (2006.01)

(52) U.S. Cl.
CPC ......... *H04M 1/72527* (2013.01); *H04M 1/04* (2013.01); *H04M 2250/16* (2013.01)

(58) Field of Classification Search
CPC ............ H04W 88/02; H04W 52/0254; H04W 52/0248; H04W 52/0229; H04M 1/21
USPC ................ 455/557, 559, 567; 345/1.1, 2.1–3
See application file for complete search history.

(56) References Cited

U.S. PATENT DOCUMENTS

| | | | | |
|---|---|---|---|---|
| 5,978,833 A | * | 11/1999 | Pashley et al. | ............... 709/200 |
| 7,433,712 B2 | * | 10/2008 | Moran et al. | ................. 455/557 |
| 2002/0198030 A1 | * | 12/2002 | Shima | ..................... G06F 1/162 |
| | | | | 455/566 |

(Continued)

FOREIGN PATENT DOCUMENTS

| | | |
|---|---|---|
| EP | 1 953 989 A1 | 8/2008 |
| JP | 2000-330918 A | 11/2000 |

(Continued)

OTHER PUBLICATIONS

International Search Report corresponding to PCT/JP2012/073079 dated Nov. 6, 2012 (5 pages).

(Continued)

*Primary Examiner* — CongVan Tran
(74) *Attorney, Agent, or Firm* — Wilmer Cutler Pickering Hale and Dorr LLP

(57) ABSTRACT

A setting system including a mobile terminal having an interface with an external device so as to transmit and receive information therebetween; and a display device having the interface with the mobile terminal so as to transmit and receive information therebetween, a display section whose screen size is larger than the mobile terminal, and an input section to which the user can input information. When the mobile terminal and the display device are connected through the interface, the mobile terminal and the display device display a setting screen that includes a setting item that sets at least the state of the mobile terminal such that the user can change a setting for the mobile terminal on the setting screen.

10 Claims, 10 Drawing Sheets

(56) References Cited

U.S. PATENT DOCUMENTS

| | | | |
|---|---|---|---|
| 2004/0063464 A1* | 4/2004 | Akram et al. | 455/559 |
| 2006/0143465 A1* | 6/2006 | Lai et al. | 713/182 |
| 2006/0160569 A1* | 7/2006 | Chen et al. | 455/557 |
| 2007/0264983 A1* | 11/2007 | Chen et al. | 455/414.1 |
| 2007/0283953 A1* | 12/2007 | Angelini | B63C 11/02 128/201.27 |
| 2008/0120448 A1* | 5/2008 | Shi | G06F 3/03543 710/72 |
| 2009/0262661 A1 | 10/2009 | Ueda et al. | |
| 2010/0194765 A1* | 8/2010 | Nakamura | 345/520 |
| 2011/0098087 A1 | 4/2011 | Tseng | |
| 2011/0256905 A1* | 10/2011 | Ryan | 455/556.1 |
| 2012/0021803 A1* | 1/2012 | Kikkawa | H04L 63/10 455/557 |
| 2012/0038541 A1* | 2/2012 | Song | G06F 3/1423 345/1.1 |
| 2012/0088548 A1* | 4/2012 | Yun | G08C 17/02 455/557 |
| 2013/0094423 A1* | 4/2013 | Wengrovitz | H04L 12/1836 370/312 |
| 2014/0250357 A1* | 9/2014 | Ryu et al. | 715/205 |
| 2016/0196048 A1* | 7/2016 | Khoury | G06F 3/04845 715/761 |

FOREIGN PATENT DOCUMENTS

| | | |
|---|---|---|
| JP | 2002-044876 A | 2/2002 |
| JP | 2002-344646 A | 11/2002 |
| JP | 2003-244343 A | 8/2003 |
| JP | 2005-130339 A | 5/2005 |
| JP | 2005-150825 A | 6/2005 |
| JP | 2007-005915 A | 1/2007 |
| JP | 2008-000325 A | 1/2008 |
| JP | 2008-113105 A | 5/2008 |
| JP | 2009-049669 A | 3/2009 |
| JP | 2009-049678 A | 3/2009 |
| JP | 2010-038843 A | 2/2010 |
| JP | 2011-082677 A | 4/2011 |
| JP | 2011-117775 A | 6/2011 |
| JP | 2011-239286 A | 11/2011 |
| JP | 2013-126220 A | 6/2013 |
| WO | WO-2007/055326 A1 | 5/2007 |

OTHER PUBLICATIONS

Japanese Office Action issued by the Japan Patent Office for Japanese Application No. 2016-147430 dated Jun. 6, 2017 (6 pages).

* cited by examiner

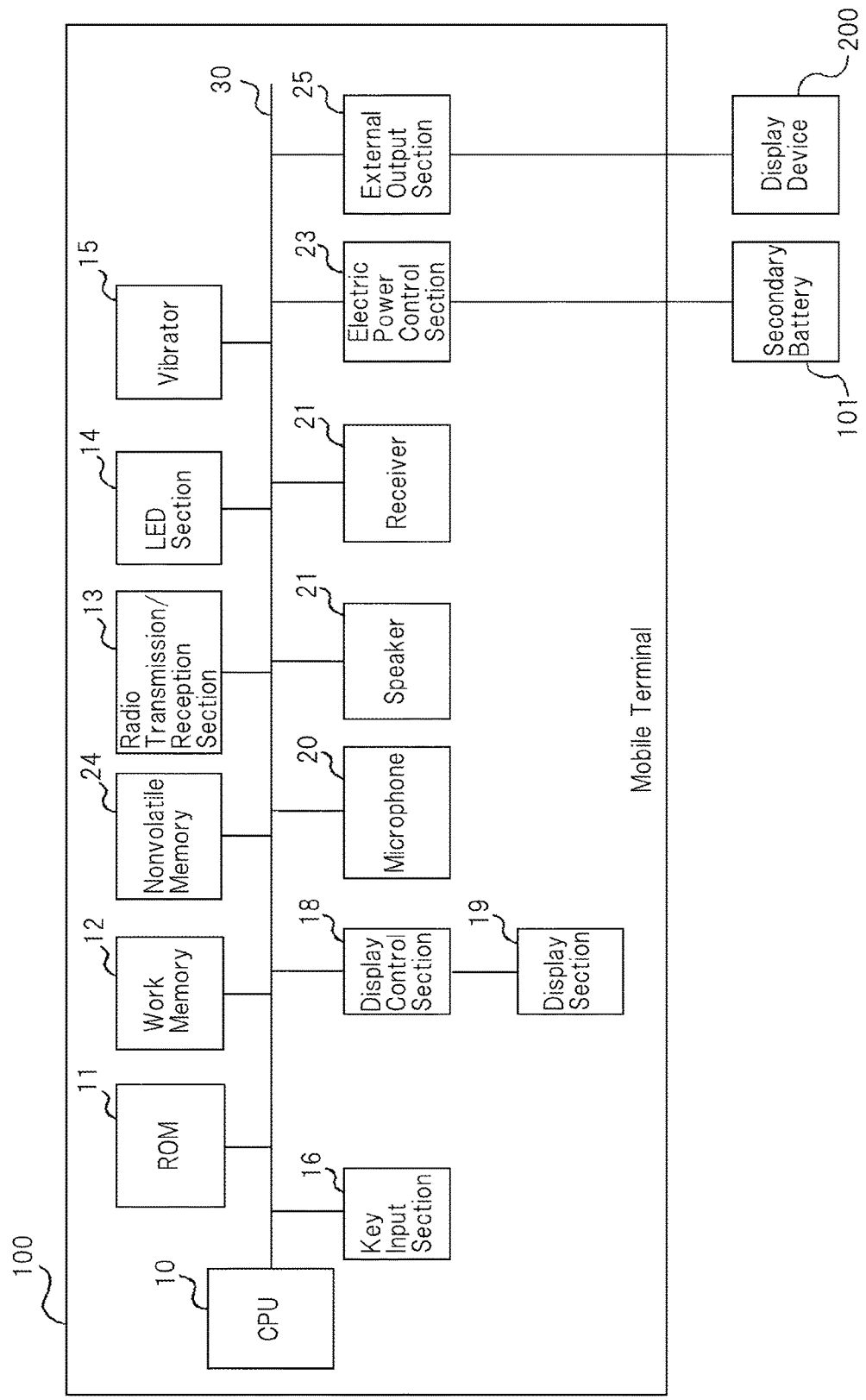

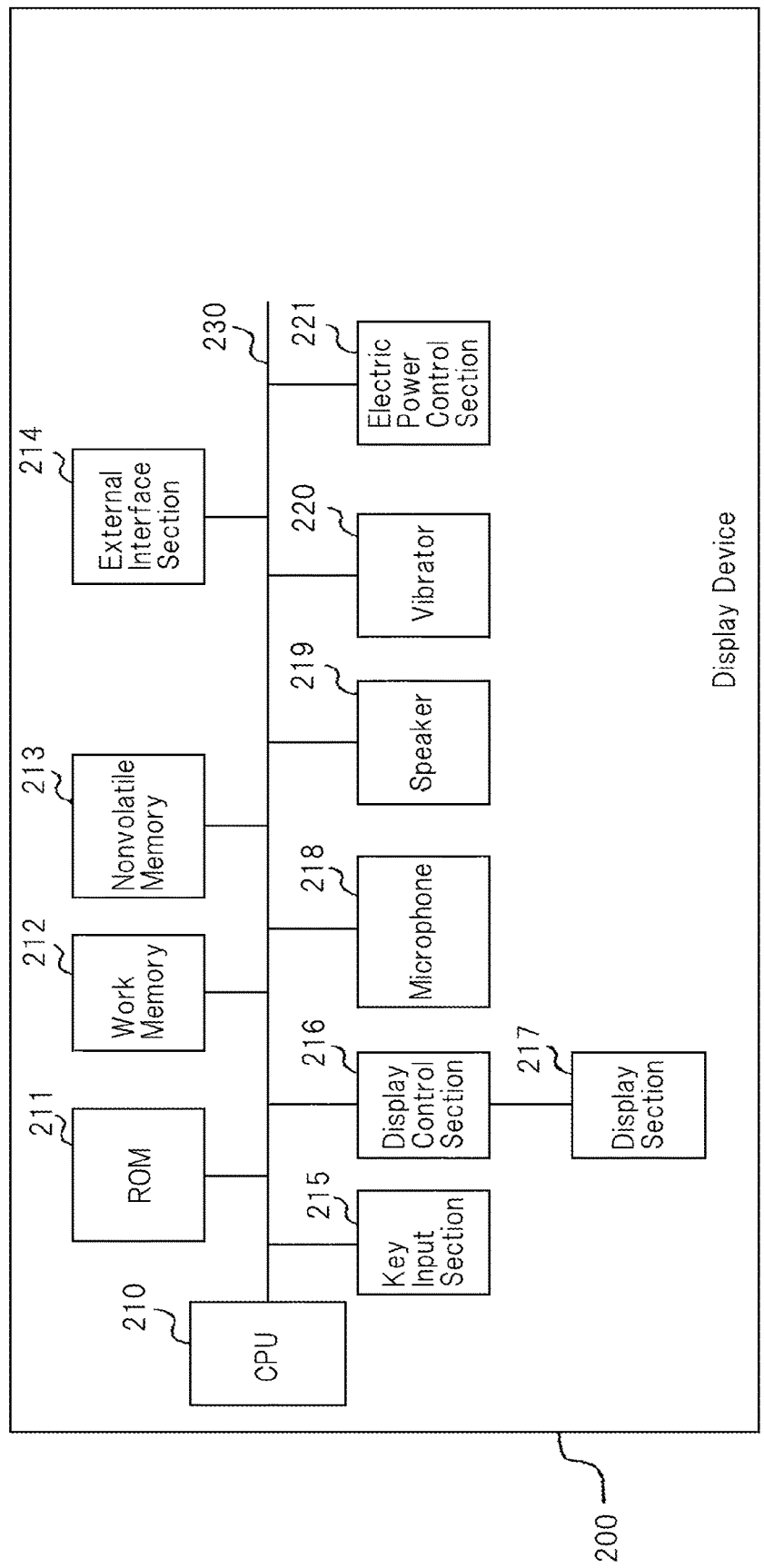

SETTING SYSTEMS AND SETTING METHODS

CROSS-REFERENCE TO RELATED APPLICATIONS

This application is a national stage application of International Application No. PCT/JP2012/073079 entitled "Setting System and Setting Methods," filed on Sep. 10, 2012, which claims the benefit of the priority of Japanese Patent Application No. 2011-275598, filed on Dec. 16, 2011, the disclosures of each of which are hereby incorporated by reference in their entirety.

TECHNICAL FIELD

The present invention relates to setting systems and setting methods that set the states of mobile terminals.

BACKGROUND ART

In recent years, highly functional mobile terminals—so called smartphones, which are provided with the telephone function and information processing function, have become common Since the smartphone is small and light, it has an advantage of mobility. The user, however, sometimes wants to use a larger screen than the smartphone when he or she watches a television program or a moving picture.

In this case, the smartphone might be connected to a personal computer—desktop type, note type, tablet type, or the like—or a television receiver that has a larger screen than the smartphone—and an image that is output from the smartphone might be displayed on the screen of the connected device.

A technique that allows information that is output from a mobile terminal to be displayed on a larger screen than the mobile terminal is described for example in Patent Literature 1. It describes that when the user is playing, for example, a game machine such as a slot machine and the mobile terminal of the user is receiving a telephone call, the machine notifies the user that the mobile terminal is receiving the telephone call and reply messages to the telephone call can be selected on the display of the machine by the user.

As described above, when the user connects the smartphone, for example, to a personal computer of tablet type—hereinafter referred to as a tablet device—and watches a television program, a moving picture, or the like on the screen of the tablet device, if the smartphone has been set for the silent mode, which may be also called the vibration mode, the smartphone will not output a sound signal and thereby the tablet device or the like will not output sound. In such a case, the user has to change the setting of the smartphone—has to cancel the silent mode of the smartphone—before or after he or she connects the smartphone to the tablet device or the like.

In addition, besides the screen size, the smartphone and the tablet device or the like may differ in their resolution. In this case, it is preferred that the size of an image displayed on the device—tablet device or the like—that is connected to the smartphone be set on the smartphone based on the screen size, screen resolution, and so forth of the connected device—tablet device or the like.

Some tablet devices have an interface mechanism that internally holds the smartphone such that the tablet devices can be connected the smartphone instead of the use of a cable or the like. In such an interface structure, the input section, such as touch panel, and the hardware resources, such as receiver, speaker, microphone, and various sensors, that are used for the telephone function of the smartphone cannot be used. Thus, after the tablet device and the smartphone are connected, it would become difficult to set the smartphone using the input section. In this case, before the tablet device and the smartphone are connected, the setting of the smartphone has to be changed. Alternatively, after they are connected, the setting of the smartphone has to be changed using the input section of the tablet device.

However, it may be difficult for the user to set the device that is connected to the smartphone for some values that are to be set such as screen size. Since the hardware resources—and the specifications—of the smartphone differ from those of other devices having larger screen sizes than the smartphone, it is difficult to imagine the specifications of various devices that can be connected the smartphone and decide the setting values of the smartphone based thereon. If the settings of the smartphone are changed on the tablet device or the like after they have been connected, since the user has to select the necessary setting items for the smartphone on the tablet device, input the necessary setting values to the tablet device, cause the tablet device to notify the smartphone of the changed setting values, and cause the smartphone to change its setting values, the setting operations that he or she has to perform would become bothersome.

Thus, if the user uses the smartphone together with a device having a larger screen than the smartphone, before he or she connects the devices, he or she would have had to change the settings of the smartphone which causes inconvenience. Even after the user has connected the smartphone and the device, he or she has to perform a bothersome operation—change the settings of the smartphone.

RELATED ART LITERATURE

Patent Literature

Patent Literature 1: Japanese Patent Laid-Open No. 2008-000325

SUMMARY

An object of the present invention is to provide setting systems and setting methods that can solve the inconvenience in which the user has to have changed the settings values of the mobile terminal before he or she connects the mobile terminal and another device and that can omit the bothersome operation in which he or she has to change the settings values for the mobile terminal after he or she has connected the mobile terminal and the device.

To accomplish the foregoing object, an exemplary aspect of the setting system of the present invention includes:

a mobile terminal having an interface with an external device so as to transmit and receive information therebetween; and a display device having said interface with said mobile terminal so as to transmit and receive information therebetween, a display section whose screen size is larger than said mobile terminal, and an input section to which the user can input information, wherein when said mobile terminal and said display device are connected through said interface, said mobile terminal and said display device display a setting screen that includes a setting item that sets at least the state of said mobile terminal such that said user can change a setting for the mobile terminal on said setting screen.

On the other hand, an exemplary aspect of the setting method of the present invention is a setting method that sets the state of a mobile terminal connected to a display device through an interface, said mobile terminal having said interface with an external device so as to transmit and receive information therebetween, said display device having said interface with said mobile terminal so as to transmit and receive information therebetween, a display section whose screen size is larger than said mobile terminal, and an input section to which the user can input information, the setting method including:

displaying a setting screen that includes a setting item that sets at least the state of said mobile terminal such that said user can change a setting for said mobile terminal on said setting screen when said mobile terminal and said display device are connected through said interface.

BRIEF DESCRIPTION OF DRAWINGS

FIG. 2A is a block diagram showing an example of the structure of a mobile terminal shown in FIG. 1.

FIG. 2B is a block diagram showing an example of the structure of a display device shown in FIG. 1.

EXEMPLARY EMBODIMENT

Next, with reference to the accompanying drawings, the present invention will be described.

Figure 1:
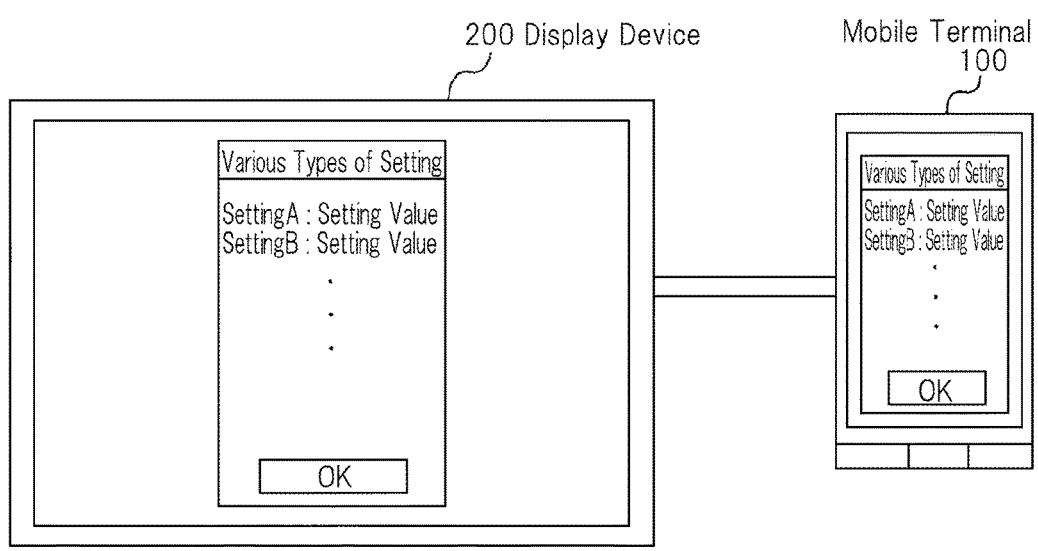
FIG. 1 is a block diagram showing an example of the structure of a setting system according to the present invention.

FIG. 1 is a block diagram showing an example of the structure of a setting system according to the present invention.

As shown in FIG. 1, the setting system according to the present invention has mobile terminal 100 and display device 200. Display device 200 is provided with a display section having a larger screen than mobile terminal 100 and an input section that is a touch panel, input keys, or the like. Mobile terminal 100 and display device 200 are connected with a cable or the like such that various types of data can be transmitted and received between mobile terminal 100 and display device 200.

Mobile terminal 100 is, for example, a mobile terminal called a smartphone that is provided with a known telephone function and a PDA (Personal Data Assistant or Personal Digital Assistants) function.

Display device 200 is, for example, a personal computer—note type, desktop type, tablet type, or the like—or a television receiver that can input characters, symbols, information, or the like through a remote controller.

Mobile terminal 100 and display device 200 are connected through a known interface system—HDMI (High-Definition Multimedia Interface) that is used to transmit and receive a picture and sound or USB (Universal Serial Bus) used to transmit and receive data with an external device—or a dedicated interface circuit.

FIG. 2A is a block diagram showing an example of the structure of the mobile terminal shown in FIG. 1.

As shown in FIG. 2A, mobile terminal 100 according to this embodiment has CPU 10, ROM 11, work memory 12, nonvolatile memory 24, radio transmission/reception section 13, LED section 14, vibrator 15, key input section 16, display section 19, display control section 18, microphone 20, speaker 21, receiver 22, electric power control section 23, and external output section 25 each of which is mutually connected through bus 30. Display section 19 is connected to display control section 18; secondary battery 101 that is a main electric power source that supplies predetermined electric power to mobile terminal 100 is connected to electric power control section 23; and display device 200 shown in FIG. 1 is connected to external output section 25.

ROM (Read Only Memory) 11 is nonvolatile memory that stores a control program that causes CPU 10 to execute various types of processes. CPU 10 executes processes based on the control program stored in ROM 11 so as to accomplish the known smartphone's function and the function as mobile terminal 100 with which a setting system according to the present invention is provided. The setting system will be described later.

Work memory 12 temporarily stores data that CPU 10 uses when it executes the processes based on the control program. Work memory 12 is, for example, RAM (Random Access Memory).

Nonvolatile memory 24 is a rewritable nonvolatile storage device (semiconductor memory or hard disk device) that stores telephone directory data, various types of setting values, user data, and so forth.

Radio transmission/reception section 13 is a known radio circuit that transmits and receives various types of data such as sound and an image through radio communication.

LED section 14 is an electronic part that is provided with a plurality of LEDs (Light Emitting Diodes) that emit different colors of light and that can change the blinking patterns or the like of the LEDs so as to notify the user that mobile terminal 100 is receiving or has received a telephone call or electronic mail.

Vibrator 15 is an electronic part that vibrates but does not create sound so as to notify the user that mobile terminal 100 is receiving a telephone call or electronic mail.

Display section 19 is a liquid crystal display, an organic EL panel, or the like that displays an image based on image information and a picture signal supplied from CPU 10. Located on display section 19 may be a touch panel that is used for the user to input information such as characters, numerals, symbols, and so forth based on an image displayed on display section 19 to mobile terminal 100.

Display control section 18 is a control circuit that controls display section 19 to display an image and a picture.

Key input section 16 is an input circuit that accepts information such as characters, numerals, symbols, commands, and so forth that the user inputs through hardware input keys, the touch panel, or the like so as to turn ON/OFF the electric power supply and select various settings.

Microphone 20, speaker 21, and receiver 22 are audio parts that are used when the user uses mobile terminal 100 as a telephone. The voice of the user is input to mobile terminal 100 through microphone 20. The voice of the communication party is output from speaker 21 or receiver 22.

Electric power supply control section 221 controls secondary battery 101 to supply electric power to mobile terminal 100.

External output section 25 is an interface circuit that is provided with connectors based on various interfaces—USB, HDMI, and so forth—and is connected to display device 200 such that data can be transmitted and received between mobile terminal 100 and display device 200. As described above, external output section 25 may be provided with a dedicated interface circuit connected to display device 200 shown in FIG. 1.

FIG. 2B is a block diagram showing an example of the structure of the display device shown in FIG. 1.

As shown in FIG. 2B, display device 200 according to this embodiment has CPU 210, ROM 211, work memory 212, nonvolatile memory 213, external interface section 214, key input section 215, display section 217, display control section 216, microphone 218, speaker 219, vibrator 220, and electric power control section 221 each of which is mutually connected through bus 230. Display section 217 is connected to display control section 216; secondary battery (not shown) that is a main electric power source that supplies predetermined electric power to display device 200 is connected to electric power control section 221; and mobile terminal 100, for example, shown in FIG. 2A is connected to external interface section 214.

ROM 211 is a nonvolatile memory that stores a control program that causes CPU 210 to execute various types of processes. CPU 210 executes the processes based on the control program stored in ROM 211 so as to implement function of, for example, operating as a personal computer or a television receiver and also to implement function of operating as display device 200 with which the setting system according to the present invention is provided. The setting system will be described later.

Work memory 212 temporarily stores data that CPU 210 uses when it executes the processes based on the control program. Work memory 212 is, for example, RAM.

Nonvolatile memory 223 is a rewritable nonvolatile storage device (semiconductor memory or hard disk device) that stores various types of setting values, user data, and so forth.

External interface section 214 is provided with connectors based on various interfaces—USB used to connect display device 200 and an external device, HDMI used to transmit and receive an image, sound, and so forth such that display device 200 can be connected to a variety of devices. Display device 200 is connected to mobile terminal 100 shown in FIG. 2A through external interface section 214. As described above, external interface section 214 may be provided with a dedicated interface circuit that can be connected to mobile terminal 100 shown in FIG. 2A.

Display section 217 is a liquid crystal display, an organic EL panel, or the like that displays an image based on image information and a picture signal supplied from CPU 210. Located on display section 217 may be a touch panel that is used for the user to input information such as characters, numerals, symbols, and so forth based on an image displayed on display section 217 to display device 200.

Display control section 216 is a control circuit that controls display section 217 to display an image and a picture.

Key input section 215 is an input circuit that accepts information such as characters, numerals, symbols, commands, and so forth that the user inputs through hardware input keys, the touch panel, or the like so as to turn ON/OFF the electric power supply and select various settings.

Microphone 218 is an audio part used to input the voice of the user to display device 200.

Speaker 219 outputs sound when display device 200 reproduces multimedia content including picture and sound.

Vibrator 220 is an electronic part that vibrates but does not create sound so as to notify the user of the state in which display device 200 is operating or the like.

Electric power supply control section 221 controls secondary battery (not shown) to supply electric power to display device 200.

Although FIG. 2B shows an example of the structure of display device 200 that is not provided with the telephone function, display device 200 may realize the telephone function using the radio transmission/reception section with which mobile terminal 100 shown in FIG. 2A is provided.

Figure 3:
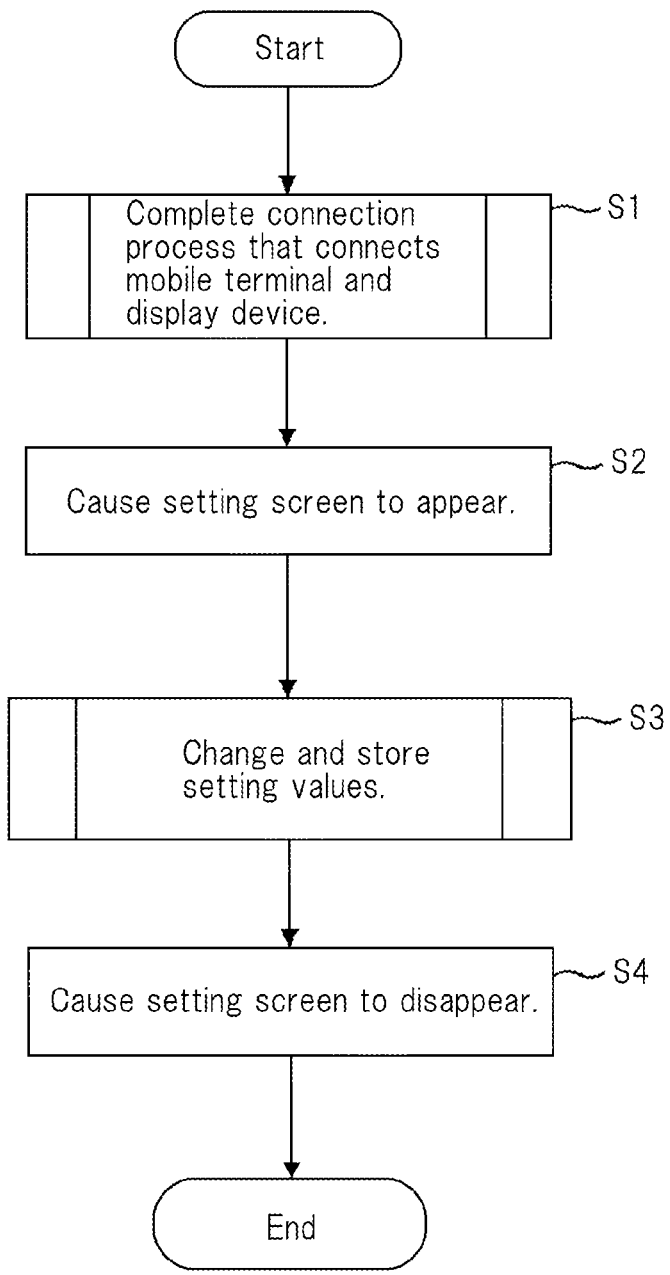
FIG. 3 is a flow chart showing an example of the process that the setting system shown in FIG. 1 executes.

FIG. 3 is a flow chart showing an example of the process that the setting system shown in FIG. 1 executes.

The setting system executes the process shown in FIG. 3 in such a manner that CPU 10 of mobile terminal 100 executes the process based on the control program stored in ROM 11 and that CPU 210 of display device 200 executes the process based on the control program stored in ROM 211.

As shown in FIG. 3, mobile terminal 100 and display device 200 are connected and then a predetermined connection process is executed therebetween based on their interface system (at step S1). Thereafter, mobile terminal 100 causes a setting screen, that includes various types of setting items that the user can select in order to set the state of mobile terminal 100, to appear on display section 19 (at step S2). Mobile terminal 100 transmits display data for the setting screen displayed on display section 19 to display device 200 through external output section 25. Thereafter, display device 200 displays the setting screen for mobile terminal 100 on display section 217 based on the display data received from mobile terminal 100. At this point, mobile terminal 100 may display a setting screen that includes various types of setting items that the user can select in order to set the state of display device 200. Alternatively, display device 200 may display a setting screen that includes various types of setting items that the user can select in order to set the state of display device 200. According to this embodiment, it is necessary for both mobile terminal 100 and display device 200 to display the setting screen for at least mobile terminal 100.

If the user changes the setting value of any setting item for mobile terminal 100 or display device 200 on the setting screen displayed on display section 19 of mobile terminal 100 or on the setting screen displayed on display section 217 of display device 200, the setting value that has been changed for mobile terminal 100 is stored in nonvolatile memory 24 and the setting value that has been changed for display device 200 is stored in nonvolatile memory 213 (at step S3). If the user changes the setting value for mobile terminal 100 on the setting screen displayed on display section 217 of display device 200, display device 200 notifies mobile terminal 100 of the setting value that has been changed. On the other hand, if the user changes the setting value for display device 200 on the setting screen displayed on display section 19 of mobile terminal 100, mobile terminal 100 notifies display device 200 of the setting value that has been changed. If the user does not change the setting value for mobile terminal 100 or display device 200 at step S3, the flow advances to step S4.

After the user has completed the setting operation, mobile terminal 100 and display device 200 are notified of information that denotes that the setting operation has been completed. If mobile terminal 100 is notified of the information that denotes that the setting operation has been completed based on the setting screen displayed on display section 217 of display device 200, mobile terminal 100 changes the setting value of the setting item on its own device based on the setting value of which display device 200 has notified mobile terminal 100. In contrast, if display device 200 is notified of the information that denotes that the setting operation has been completed based on the setting screen displayed on display section 19 of mobile terminal 100, display device 200 changes the setting value of the setting item on its own device based on the setting value of which mobile terminal 100 has notified the display device 200. Thereafter, mobile terminal 100 and display device 200 cause their setting screen to disappear (at step S4).

When mobile terminal 100 and display device 200 are connected, the setting system according to this embodiment causes the setting screen for at least mobile terminal 100 to automatically appear. Thus, if mobile terminal 100 is connected to display device 200 and is used together therewith, the user can easily change the setting values of various types of setting items for mobile terminal 100. As a result, the inconvenience in which the user has to have changed the setting values of mobile terminal 100 before he or she connects mobile terminal 100 and display device 200 can be solved. In addition, the bothersome operation in which he or she has to change the setting values for mobile terminal 100 after he or she has connected mobile terminal 100 and display device 200 can be omitted.

Next, with reference to the accompanying drawings, working examples according to the present invention will be described.
(First Working Example)

Figure 4:
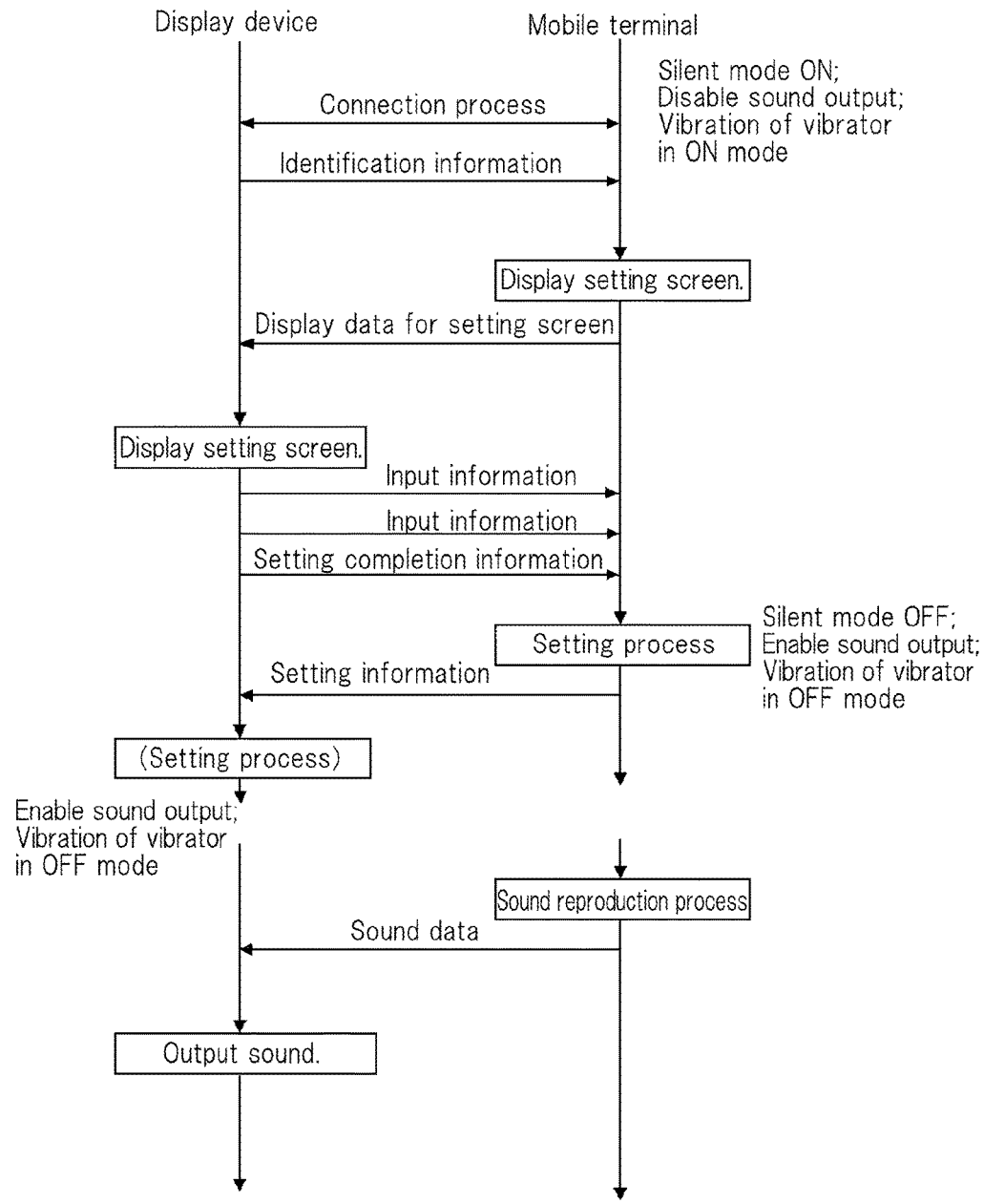
FIG. 4 is a sequence chart showing the process of a setting method according to a first working example of the present invention.

FIG. 4 is a sequence chart showing the process of a setting method according to a first working example of the present invention.

FIG. 4 shows an example of the process that connects mobile terminal 100 that has been set for the silent mode (silent mode ON) to display device 200 and then cancels the silent mode of mobile terminal 100 on the setting screen of display device 200 (silent mode OFF).

As shown in FIG. 4, mobile terminal 100 and display device 200 are connected and their connection process is performed. After the connection process is completed, display device 200 transmits information that identifies its own device (identification information) to mobile terminal 100.

Mobile terminal 100 displays a setting screen including predetermined setting items based on display device 200 that has been connected to mobile terminal 100. In addition, mobile terminal 100 transmits display data for the setting screen to display device 200. Thereafter, display device 200 displays a setting screen on display section 217 based on the display data received from mobile terminal 100. At this point, the setting screen displayed on mobile terminal 100 and the setting screen displayed on display device 200 may or may not be the same.

When the user changes the setting value of any setting item on the setting screen of display device 200 and inputs the changed setting value to the setting screen, display device 200 transmits the input value (input information) to mobile terminal 100. When the user inputs information that denotes that he or she has completed the setting to the setting screen (setting completion information), display device 200 that transmits the setting completion information to mobile terminal 100. Mobile terminal 100 changes the setting value of each setting item on its own device based on the input information transmitted from display device 200 (setting process). If the user has input a command that cancels the silent mode of mobile terminal 100 (silent mode OFF), mobile terminal 100 turns OFF the silent mode and thereby outputs sound (enable sound output). In addition, mobile terminal 100 turns OFF the vibration of vibrator 15. If the input information includes a setting item for display device 200, mobile terminal 100 transmits setting information that causes display device 200 to change the setting item thereto.

Display device 200 changes the setting item on its own device based on the command received from mobile terminal 100. For example, display device 200 outputs sound (enable sound output) and turns OFF vibration of vibrator 220.

When mobile terminal 100 starts replaying sound, mobile terminal 100 transmits sound data to display device 200 and it outputs sound based on the sound data.

If display device 200 is not provided with a speaker, speaker 21 of mobile terminal 100 may output sound. If display device 200 is provided with speaker 219, only speaker 219 can output sound. If delay of sound outputs that pass through external output section 25 and external interface section 214 can be ignored, both the speakers of mobile terminal 100 and display device 200 may output sound.
(Second Working Example)

Next, with reference to FIG. 5 and FIG. 6, a second working example of the present invention will be described.

Figure 5:
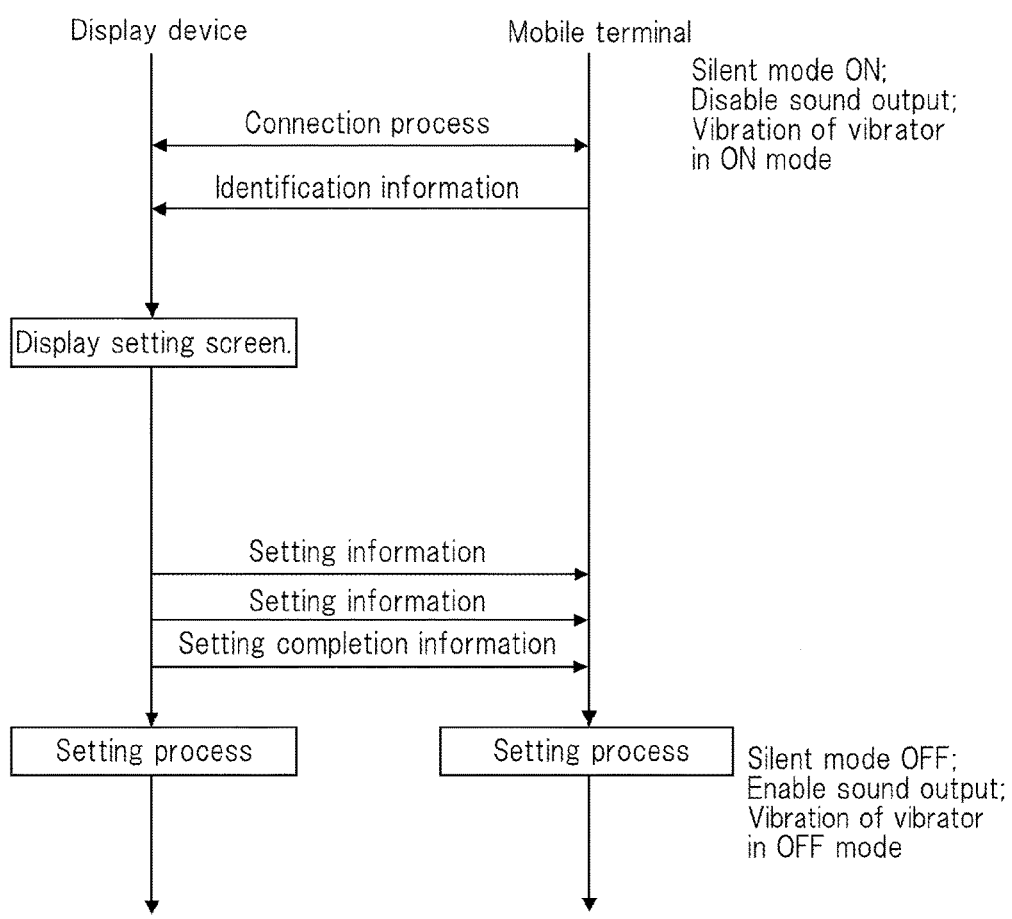
FIG. 5 is a sequence chart showing the process of a setting method according to a second working example of the present invention.
Figure 6:
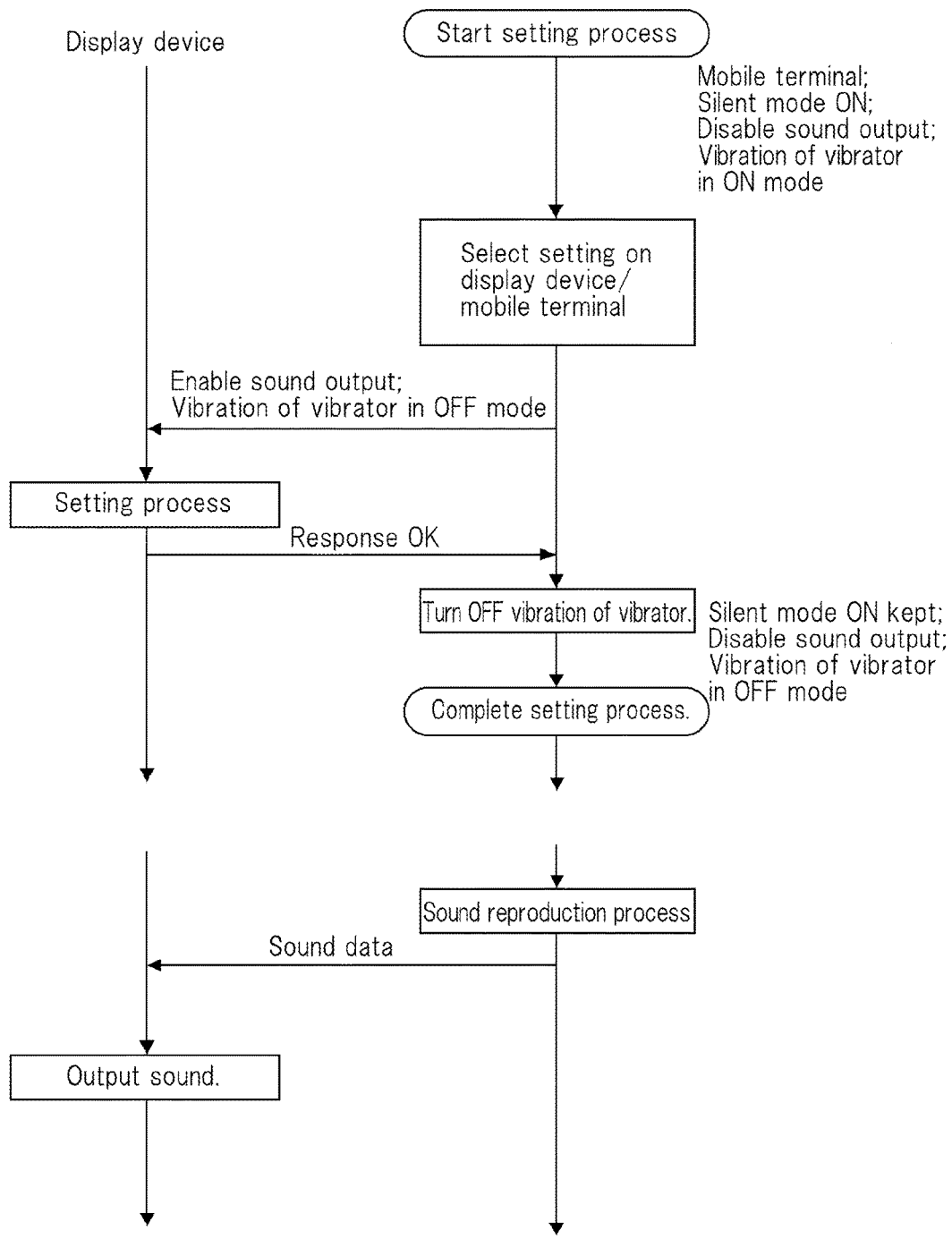
FIG. 6 is a sequence chart showing an example of the setting process according to the second working example of the present invention.

FIG. 5 is a sequence chart showing the process of a setting method according to the second working example of the present invention. FIG. 6 is a sequence chart showing an example of the setting process according to the second working example.

According to the foregoing first working example, when mobile terminal 100 and display device 200 are connected, mobile terminal 100 transmits display data for the setting screen to display device 200. Display device 200 sends back input information that the user has input on the setting screen to mobile terminal 100. In other words, according to the first working example, display device 200 transmits values that the user has input (input information) to mobile terminal 100. Mobile terminal 100 changes the setting values on its own device based on the input information.

When display device 200 according to the second working example detects that its own device has been connected to mobile terminal 100, display device 200 displays a predetermined setting screen on which the user can change settings for mobile terminal 100. When the user inputs a setting value to the setting screen of display device 200, it transmits the setting information to mobile terminal 100 and it changes the setting value on its own device based on the setting information. In other words, according to the second working example, a setting value for mobile terminal 100 is changed based on a command received from display device 200.

As shown in FIG. 5, when display device 200 performs the connection process, detects that the own device has been connected to mobile terminal 100, and receives information that identifies mobile terminal 100 (identification information) therefrom, display device 200 displays a setting screen including predetermined setting items for mobile terminal 100.

When the user inputs a setting value to the setting screen of display device 200, it transmits the setting value (setting information) to mobile terminal 100. When the user inputs information that denotes he or she has completed the setting to display device 200 (setting completion), display device 200 transmits the setting completion information to mobile terminal 100.

Mobile terminal 100 changes the setting value of the setting item based on the setting information transmitted form display device 200 (setting process). If the setting screen includes a setting item for display device 200, it changes the setting item based on the setting value, but does not transmit the setting value to mobile terminal 100.

According to the first working example, the setting process for example cancels the silent mode of mobile terminal 100. As long as display device 200 can output sound, however, it is not always necessary to cancel the silent mode of mobile terminal 100.

If the user wants to connect mobile terminal 100 that has been set for the silent mode and display device 200 and cause it to output sound, for example, he or she may set display device 200 to enable sound output and to turn OFF vibration of vibrator and may set mobile terminal 100 to a partial OFF state in the silent mode (only turn OFF vibration of vibrator 15). The user can perform these settings on the setting screen of display device 200.

In this case, mobile terminal 100 remains in the ON silent mode, in which its own device does not output sound (disable sound output). When mobile terminal 100 starts replaying sound, mobile terminal 100 transmits sound data to display device 200. Only when mobile terminal 100 replays sound, may display device 200 transmit a command that causes mobile terminal 100 to turn OFF the vibration of the vibrator to mobile terminal 100.

In the foregoing first working example and second working example, if mobile terminal 100 and display device 200 have a common setting item, the setting value of the setting item for display device 200 is changed such that the setting value is matched with that for mobile terminal 100. In other words, the setting value for mobile terminal 100 has priority over that for display device 200. Alternatively, the setting value for display device 200 may have priority over that for mobile terminal 100. In other words, if mobile terminal 100 and display device 200 have a common setting item, the setting value for the setting item for mobile terminal 100 may be changed such that the setting value is matched with that for display device 200. Thus, a setting value for display device 200 or mobile terminal 100 may have priority. As a result, the priorities of mobile terminal 100 and display device 200 can be freely pre-assigned.

Figure 7:
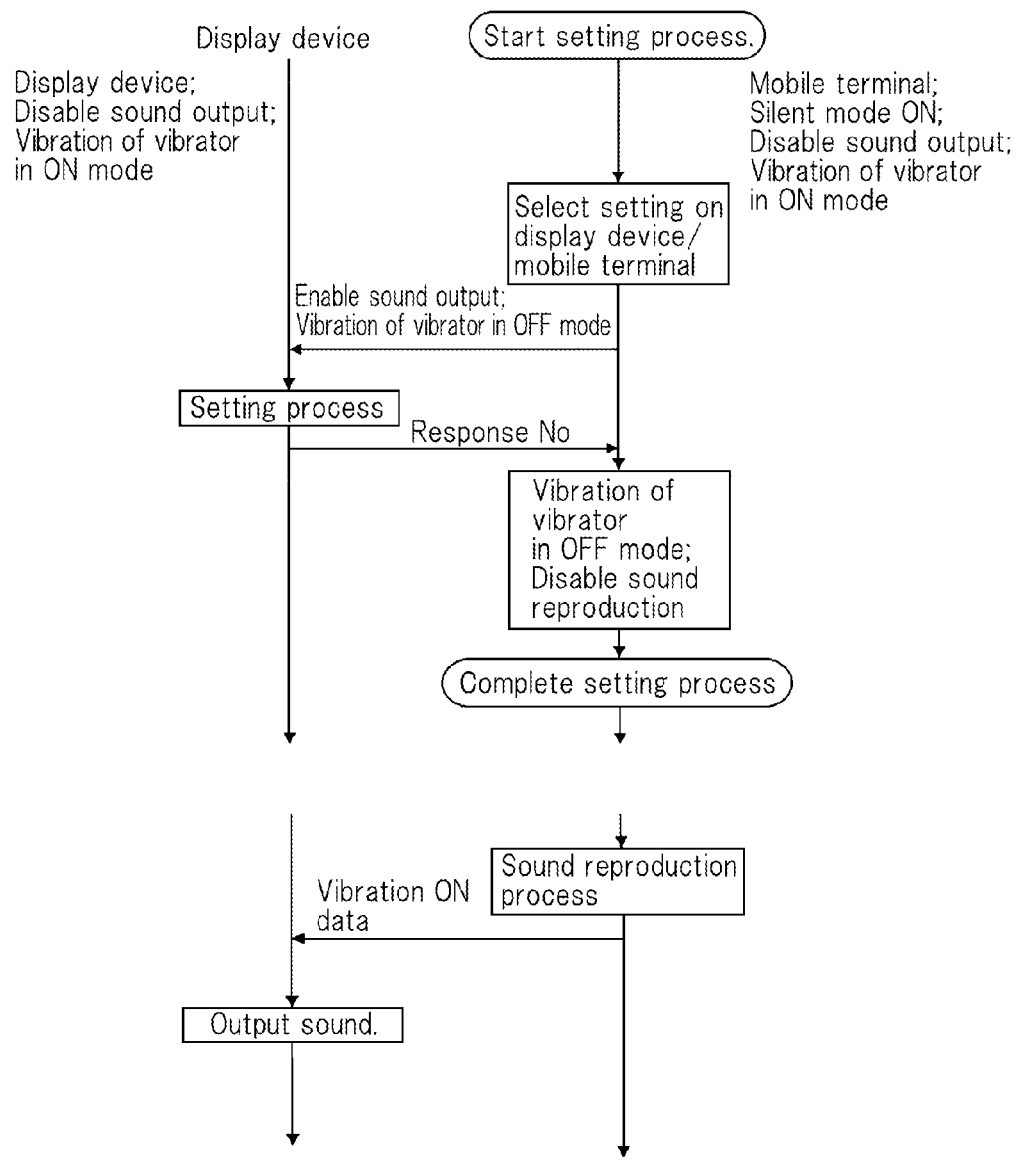
FIG. 7 is a sequence chart showing a modification of the setting process.

When display device 200 has been set to disable sound output and to turn ON the vibration of vibrator 220 as shown in FIG. 7, if the silent mode of mobile terminal 100 is cancelled, mobile terminal 100 transmits setting values to enable sound output and to turn OFF the vibration of vibrator to display device 200. In this case, display device 200 has priority over mobile terminal 100 and notifies mobile terminal 100 of the disable setting change state (response No).

While mobile terminal 100 remains in the disable sound output state, mobile terminal 100 switches vibrator 15 to OFF state so that there will be no vibration and transmits only data (vibration ON data) that cause vibrator 220 to vibrate to display device 200 such that when mobile terminal 100 is receiving a telephone call, vibrator 220 vibrates.

According to the foregoing first working example and second working example, the user sets setting items displayed on the setting screen. Alternatively, when mobile terminal 100 and display device 200 are connected, predetermined setting values may be set for predetermined setting items. For example, if the user connects mobile terminal 100 that has been set for the silent mode and causes display device 200 to output a television signal or moving picture data received by mobile terminal 100, display device 200 will not output sound of the television picture or moving picture. In this case, when mobile terminal 100 and display device 200 are connected, mobile terminal 100 may automatically cancel the silent mode. Thus, setting items for mobile terminal 100 may include those that are automatically set or changed when mobile terminal 100 and display device 200 are connected.

Of setting items displayed on the setting screen, those that are automatically displayed when mobile terminal 100 and display device 200 are connected may have been selectable by the user (setting items are customizable).

When mobile terminal 100 and display device 200 are disconnected, setting values that have been automatically set or changed for mobile terminal 100 may be automatically restored to setting values that had been set before mobile terminal 100 and display device 200 had been connected.

As described above, besides the screen size, the screen resolution of display device 200 may differ from that of mobile terminal 100. When the dot pitch (resolution) of display device 200 is smaller (greater) than that of mobile terminal 100, even if the screen size of display device 200 is greater than that of mobile terminal 100, if display device 200 displays an image without enlarging it, the size of the image displayed on display device 200 will become smaller than that of mobile terminal 100. Thus, the setting screen may include a setting item that enlarges the screen size of display device 200 with the same aspect ratio.

Since different mobile terminals 100 may be connected to display device 200, display device 200 may store setting values for these mobile terminals 100. In addition, since mobile terminal 100 may be connected to different display devices 200, mobile terminal 100 may store setting values for these display devices 200. In this case, "different mobile terminals 100 and different display devices 200 may be those of different models, those of different specifications, such as screen resolutions, and those of different individuals.

Figure 8:
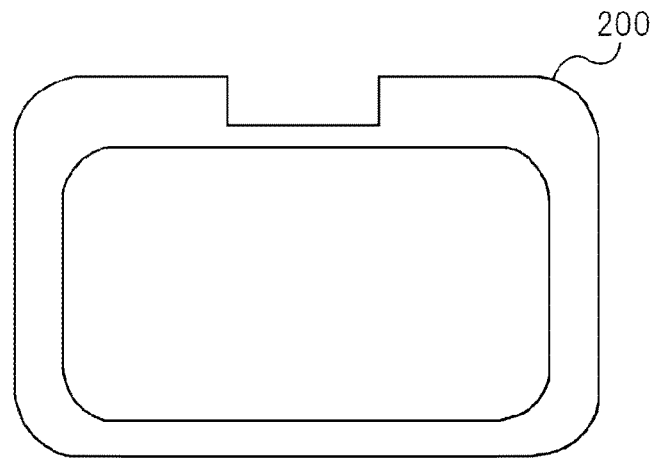
FIG. 8 is a plan view showing an example of a display device according to the present invention.
Figure 9:
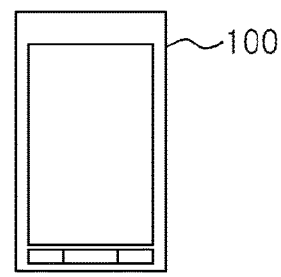
FIG. 9 is a plan view showing an example of a mobile terminal that the display device shown in FIG. 8 can internally hold.
Figure 10:
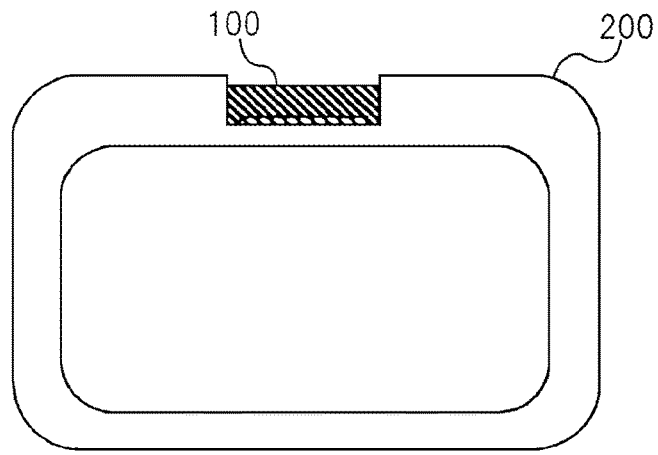
FIG. 10 is a plan view showing that the display device shown in FIG. 8 internally holds the mobile terminal shown in FIG. 9.
Figure 11:
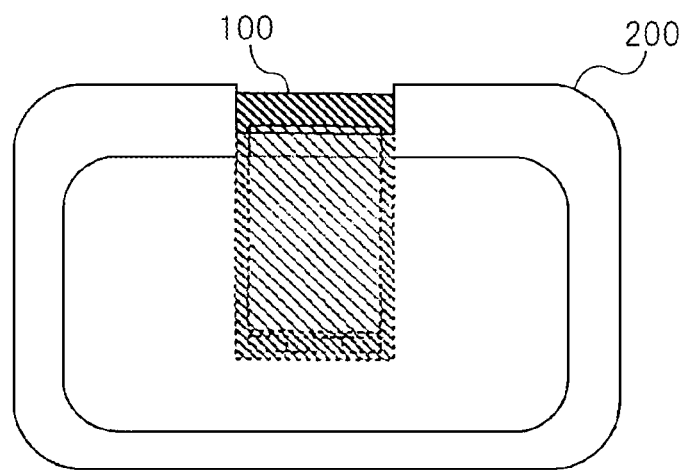
FIG. 11 is a plan view showing that the display device shown in FIG. 8 internally holds the mobile terminal shown in FIG. 9.

Besides the structure in which display device 200 and mobile terminal 100 are connected through a cable or the like shown in FIG. 1, display device 200 may have an interface—a slot in a tablet device shown in FIG. 8. When mobile terminal 100 shown in FIG. 9 is held in a slot shown in FIG. 10 or FIG. 11, mobile terminal 100 and display device 200 are connected. The present invention can be applied to display device 200 having such a slot for mobile terminal 100 and the foregoing effect can be obtained.

Since the enclosure and cover of display device 200 shown in FIG. 8 hide microphone 20 and receiver 22 used for voice communication of mobile terminal 100, they may not be substantially used.

In this case, a part of functions of mobile terminal 100 that cannot be used when mobile terminal 100 is held in display device 200 may be disabled. For example, while the radio communication function (data communication) of mobile terminal 100 is being enabled, only the telephone function may be disabled. The telephone function may be disabled in such a manner that mobile terminal 100 is forcefully placed outside the service zone, mobile terminal 100 does not notify the user that it is receiving a telephone call, or mobile terminal 100 notifies the base station and the communication party that the user of mobile terminal 100 cannot receive a telephone call, cancels the call reception process, and causes mobile terminal 100 to enter a mode in which mobile terminal 100 does not notify the user that it is receiving a telephone call (car driving mode or the like).

With reference to the embodiments, the present invention has been described. However, it should be understood by those skilled in the art that the structure and details of the present invention may be changed in various manners without departing from the scope of the present invention.

This application claims priority based on Japanese Patent Application No. 2011-275598 filed on Dec. 16, 2011, the disclosure of which is incorporated herein by reference in its entirety.

The invention claimed is:

1. A setting system, comprising:
a mobile terminal having an interface with an external device for transmitting and receiving information therebetween;
a first display device for displaying, for a first time interval, a first screen based on a first setting item of the mobile terminal; and
a second display device controlled by said external device;
wherein when said mobile terminal and said external device are connected through said interface, said second display device displays, for a second time interval, a setting screen that includes a setting item that sets at least the state of said mobile terminal such that a user can change a setting for the mobile terminal on said setting screen, wherein at least a portion of the first time interval and the second time interval overlap.

2. A mobile terminal, comprising:
an interface for communicating with an external device; and
a processor configured to:
display, for a first time interval, a first screen on a first display, wherein the first screen is based on a first setting item for setting a state of the mobile terminal; and
transmit display data via the interface, wherein the display data is associated with the first setting item for setting the state of the mobile terminal and is used for displaying, for a second time interval, a second screen on a second display controlled by an external device, wherein at least a portion of the first time interval and the second time interval overlap.

3. The mobile terminal according to claim 2, further comprising:
the first display, wherein the external device comprises the second display, and the first setting item is regarding displaying.

4. The mobile terminal according to claim 2, wherein the second screen is the same as the first screen.

5. The mobile terminal according to claim 2, wherein the second screen is different from the first screen.

6. The mobile terminal according to claim 2, wherein the processor changes a setting value of the first setting item based on input information received via the interface from the external device.

7. The mobile terminal according to claim 6, wherein the input information is associated with the setting value input based on the second screen.

8. The mobile terminal according to claim 6, wherein the input information is used for changing a setting value of a second setting item for setting a state of the external device when the second setting item corresponds to the first setting item.

9. A method for setting a state of displaying data, comprising:
displaying, for a first time interval, a first screen on a first display, wherein the first screen is based on a first setting item for setting the state; and
transmitting display data via an interface, wherein the display data is associated with the first setting item for setting the state and is used for displaying, for a second time interval, a second screen on a second display,
wherein at least a portion of the first time interval and the second time interval overlap,
wherein the state is a state of a mobile terminal,
wherein the second display is controlled by an external device.

10. A system, comprising:
an external device; and
a mobile device comprising:
an interface for communicating with the external device; and
a processor configured to:
display, for a first time interval, a first screen on a first display, wherein the first screen is based on a first setting item for setting a state of the mobile terminal; and
transmit display data via the interface, wherein the display data is associated with the first setting item for setting the state of the mobile terminal and is used for displaying, for a second time interval, a second screen on a second display controlled by an external device, wherein at least a portion of the first time interval and the second time interval overlap.

* * * * *